(12) United States Patent
Chen (10) Patent No.: US 7,509,889 B2
(45) Date of Patent: Mar. 31, 2009

(54) BICYCLE PEDAL ASSEMBLY

(76) Inventor: Chung-I Chen, No. 2, Lane 986, Sec. 1, Chung-Shan Rd., Ta-Chia Chen, Taichung Hsien (TW)

( * ) Notice: Subject to any disclaimer, the term of this patent is extended or adjusted under 35 U.S.C. 154(b) by 119 days.

(21) Appl. No.: 11/605,768

(22) Filed: Nov. 29, 2006

(65) Prior Publication Data

US 2008/0121068 A1    May 29, 2008

(51) Int. Cl.
*B62M 3/00* (2006.01)
(52) U.S. Cl. ............... 74/594.6; 74/594.1; 74/594.4
(58) Field of Classification Search ............ 74/594.1, 74/594.4, 594.6
See application file for complete search history.

(56) References Cited

U.S. PATENT DOCUMENTS

| 5,060,537 | A | * | 10/1991 | Nagano | ............ 74/594.6 |
| 2005/0081679 | A1 | | 4/2005 | Chen | |
| 2006/0070489 | A1 | | 4/2006 | Chen | |
| 2006/0081087 | A1 | | 4/2006 | Muraoka et al. | |

FOREIGN PATENT DOCUMENTS

| EP | 0753454 | 1/1997 |
| EP | 0887255 | 12/1998 |

* cited by examiner

*Primary Examiner*—Richard W L Ridley
*Assistant Examiner*—Justin Krause (57) ABSTRACT

A bicycle pedal assembly includes a pedal body having a sleeve tube and front and rear protruding portions. A front clamping member is mounted rotatably on the front protruding portion, and is biased by a front biasing member to rotate toward the sleeve tube. A locking member is connected to the front protruding portion, and is operable to abut against the front clamping member so as to lock the latter against rotational movement. A rear clamping member is mounted rotatably on the rear protruding portion, and is biased by a rear biasing member to rotate toward the sleeve tube. An adjusting member is connected to the rear clamping member, and is operable to adjust the biasing force of the rear biasing member.

4 Claims, 9 Drawing Sheets

BICYCLE PEDAL ASSEMBLY

BACKGROUND OF THE INVENTION

1. Field of the Invention

The invention relates to a pedal, more particularly to a bicycle pedal assembly.

2. Description of the Related Art

Figure 1:
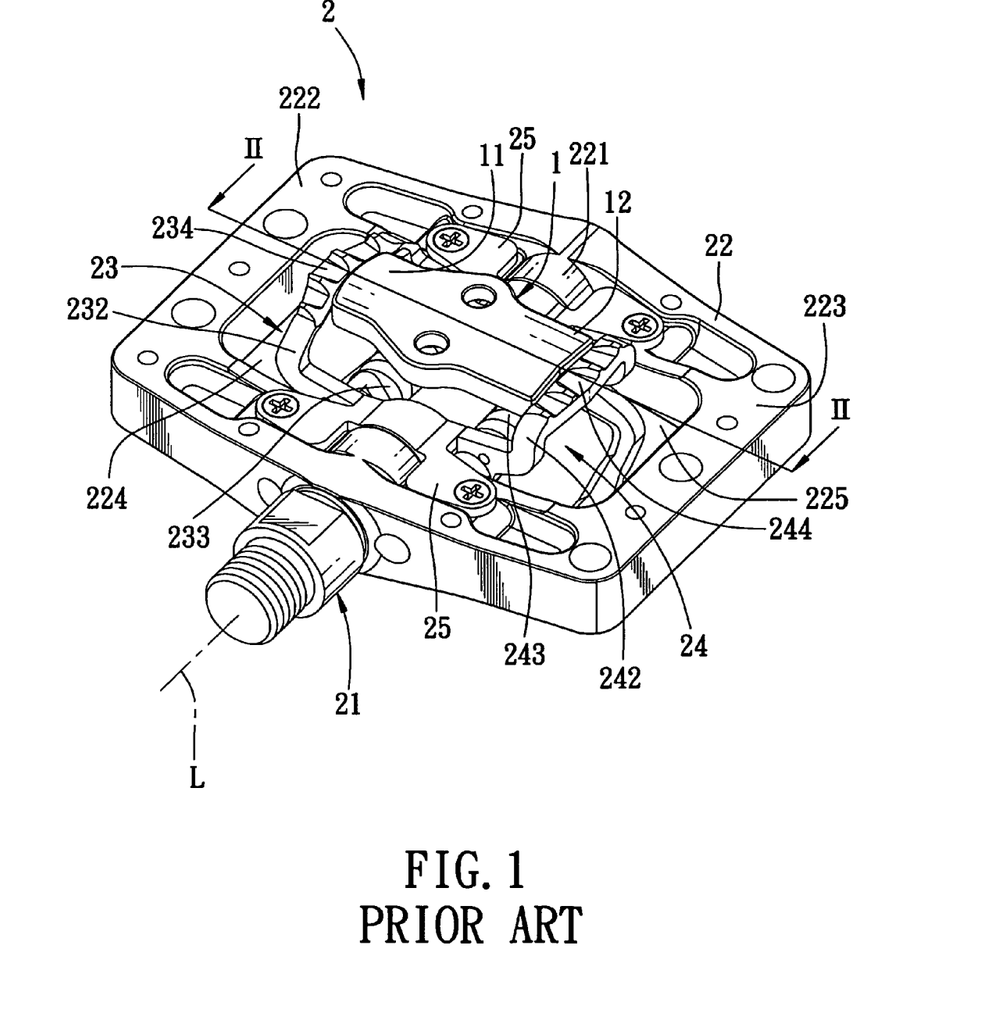
FIG. 1 is a perspective view of a conventional bicycle pedal assembly disclosed in U.S. Patent Application Publication No. 2006/0070489.
Figure 2:
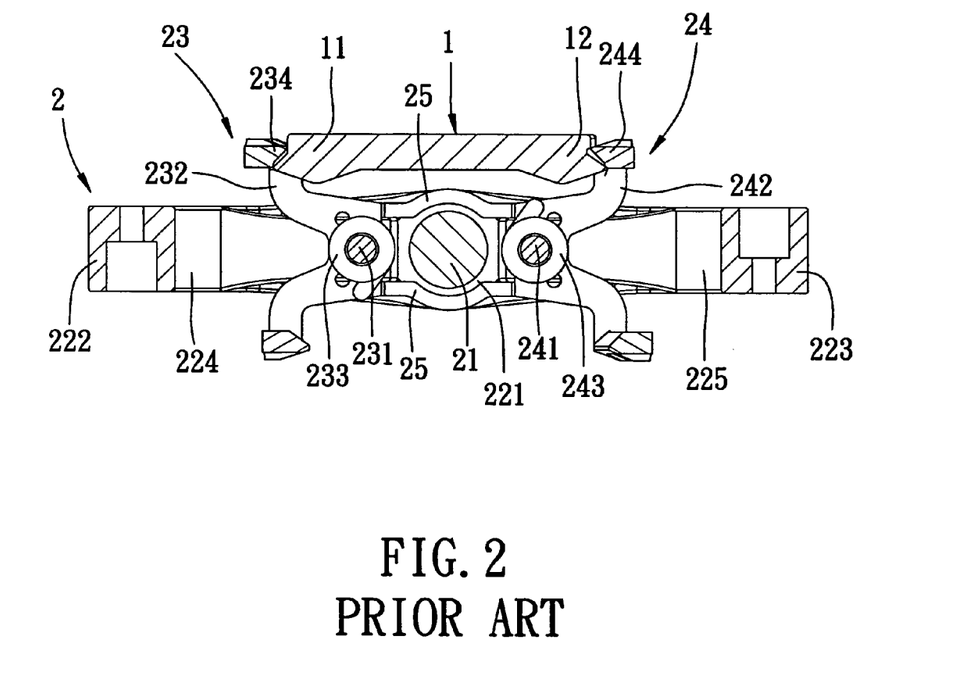
FIG. 2 is a sectional view of the conventional bicycle pedal assembly taken along line II-II of FIG. 1.
Figure 3:
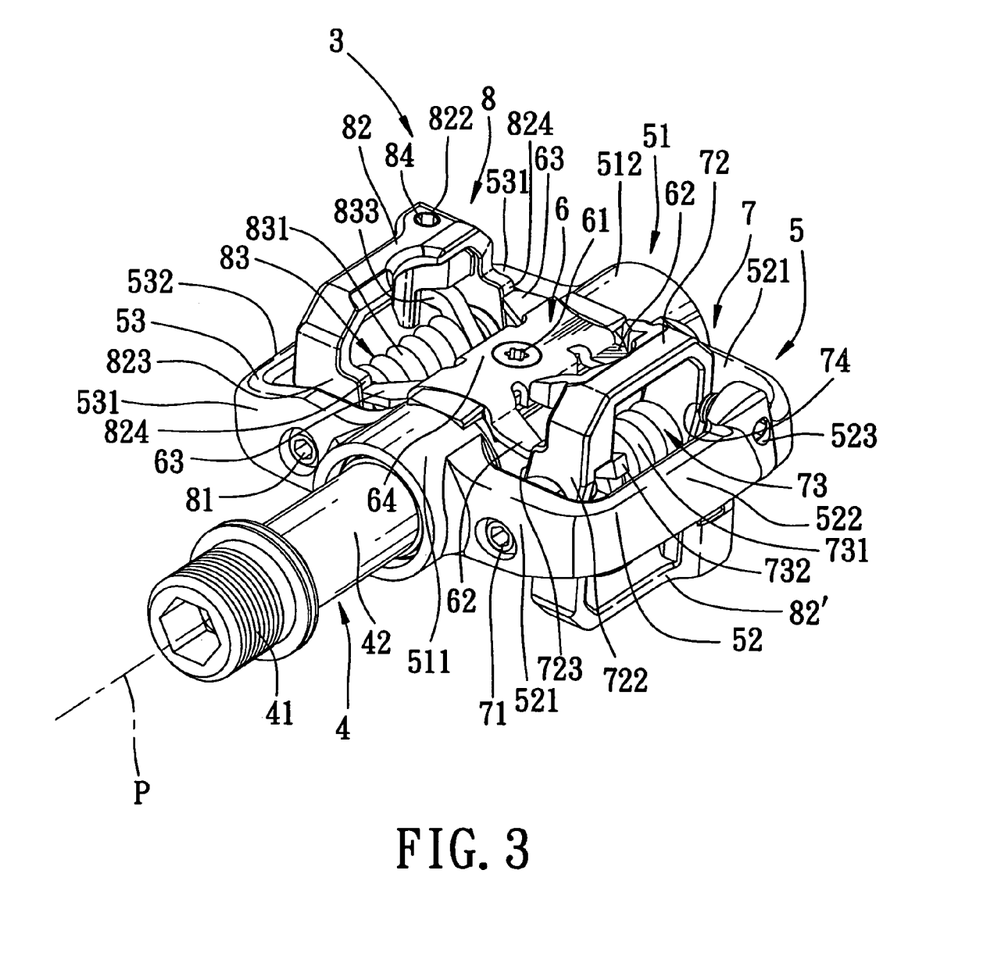
FIG. 3 is a perspective view of the preferred embodiment of a bicycle pedal assembly according to the present invention.

Referring to FIGS. 1 and 2, a conventional bicycle pedal assembly, as disclosed in U.S. Patent Application Publication No. 2006/0070489, includes a cleat 1 and a pedal body unit 2. The cleat 1 is connected fixedly to a shoe sole of a cyclist, and includes front and rear end engaging portions 11, 12. The pedal body unit 2 includes a pedal shaft 21, a pedal body 22 sleeved on the pedal shaft 21, front and rear clamping units 23, 24, and inner and outer stop members 25 disposed on the pedal body 22.

The pedal shaft 21 extends along an L-axis. The pedal body 22 includes a sleeve tube 221 sleeved rotatably on the pedal shaft 21 and rotatable about the L-axis, front and rear portions 222, 223 connected to the sleeve tube 221 and extending in opposite directions, a front receiving space 224 defined by the front portion 222 and the sleeve tube 221, and a rear receiving space 225 defined by the rear portion 223 and the sleeve tube 221.

The front clamping unit 23 includes a front pivot pin 231 disposed within the front receiving space 224, a front clamping member 232 sleeved rotatably on the front pivot pin 231, and a front torsional spring 233 sleeved on the front pivot pin 231 for biasing the front clamping member 232 to rotate toward the sleeve tube 221. The front clamping member 232 has a front engaging portion 234 engaged to the front end engaging portion 11 of the cleat 1.

The rear clamping unit 24 includes a rear pivot pin 241 disposed within the rear receiving space 225, a rear clamping member 242 sleeved rotatably on the rear pivot pin 241, and a rear torsional spring 243 sleeved on the rear pivot pin 241 for biasing the rear clamping member 242 to rotate toward the sleeve tube 221. The rear clamping member 242 has a rear engaging portion 244 engaged to the rear end engaging portion 12 of the cleat 1.

In use, the cleat 1 is positioned on the pedal body unit 2, and is pressed downwardly so that the front and rear end engaging portions 11, 12 of the cleat 1 can engage respectively the front engaging portion 234 of the front clamping member 23 and the rear engaging portion 244 of the rear clamping member 24.

Although the aforementioned conventional bicycle pedal assembly can achieve its intended purpose, no adjusting mechanism is provided to allow for varying applications.

SUMMARY OF THE INVENTION

Therefore, the object of the present invention is to provide a bicycle pedal assembly that has an adjustable function to thereby allow for use in a variety of ways.

According to one aspect of this invention, a bicycle pedal assembly is adapted for engagement with a cleat which is fixed to a shoe sole. The bicycle pedal assembly comprises a pedal shaft, a pedal body, and front and rear clamping units. The pedal body includes a sleeve tube sleeved rotatably on the pedal shaft, and front and rear protruding portions connected to the sleeve tube and extending in opposite directions. The front clamping unit includes a front pivot pin, a front clamping member mounted rotatably on the front pivot pin, a front biasing member to bias the front clamping member to rotate toward the sleeve tube, and a locking member connected threadedly to the front protruding portion. The front clamping member has a front engaging portion that is adapted to engage one end of the cleat. The locking member is operable to abut against the front clamping member so as to lock the front clamping member against rotational movement. The rear clamping unit includes a rear clamping member mounted rotatably on the rear protruding portion, and a rear biasing member to bias the rear clamping member to rotate toward the sleeve tube. The rear clamping member has a rear engaging portion that is adapted to engage another end of the cleat.

According to another aspect of this invention, a bicycle pedal assembly is adapted for engagement with a cleat which is fixed to a shoe sole. The bicycle pedal assembly comprises a pedal shaft, a pedal body, and front and rear clamping units. The pedal body includes a sleeve tube sleeved rotatably on the pedal shaft, and front and rear protruding portions connected to the sleeve tube and extending in opposite directions. The front clamping unit includes a front clamping member mounted rotatably on the front protruding portion, and a front biasing member to bias the front clamping member to rotate toward the sleeve tube. The front clamping member has a front engaging portion that is adapted to engage one end of the cleat. The rear clamping unit includes a rear clamping member mounted rotatably on the rear protruding portion, a rear biasing member to bias the rear clamping member to rotate toward the sleeve tube, and an adjusting member connected threadedly to the rear clamping member for abutting against the rear biasing member. The rear clamping member has a rear engaging portion that is adapted to engage another end of the cleat. The adjusting member is movable relative to the rear clamping member between a first position, where the adjusting member causes the rear biasing member to produce a minimum biasing force, and a second position, where the adjusting member causes the rear biasing member to produce a maximum biasing force.

According to still another aspect of this invention, a bicycle pedal assembly is adapted for engagement with a cleat which is fixed to a shoe sole. The bicycle pedal assembly comprises a pedal shaft, a pedal body, and front and rear clamping units. The pedal body includes a sleeve tube sleeved rotatably on the pedal shaft, and front and rear protruding portions connected to the sleeve tube and extending in opposite directions. The front clamping unit includes a front clamping member mounted rotatably on the front protruding portion, a front biasing member to bias the front clamping member to rotate toward the sleeve tube, and a locking screw connected to the front protruding portion. The front clamping member has a front engaging portion that is adapted to engage one end of the cleat. The locking screw is operable to abut against the front clamping member so as to lock the front clamping member against rotational movement. The rear clamping unit includes a rear clamping member mounted rotatably on the rear protruding portion, a rear biasing member to bias the rear clamping member to rotate toward the sleeve tube, and an adjusting screw connected to the rear clamping member for abutting against the rear biasing member. The rear clamping member has a rear engaging portion that is adapted to engage another end of the cleat. The adjusting screw is movable relative to the rear clamping member between a first position, where the adjusting screw causes the rear biasing member to produce a minimum biasing force, and a second position, where the adjusting screw causes the rear biasing member to produce a maximum biasing force.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Referring to FIGS. 3 to 9, the preferred embodiment of a bicycle pedal assembly 3 according to the present invention is adapted for engagement with a cleat 9 which is fixed to a shoe sole, and is shown to comprise a pedal shaft 4, a pedal body 5, a front clamping unit 7, and a rear clamping unit 8. Since a right bicycle pedal assembly 3 is a mirror image of a left bicycle pedal assembly 3, only the left bicycle pedal assembly 3 will be described in this embodiment.

The pedal shaft 4 has a central axis (P), and includes an inner section 41 adapted to be connected to a bicycle's pedal crank (not shown), and an outer section 42 opposite to the inner section 41. The inner and outer sections 41, 42 extend along the central axis (P).

The pedal body 5 includes a sleeve tube 51 sleeved on the outer section 42 of the pedal shaft 4 and rotatable about the central axis (P), and front and rear protruding portions 52, 53 connected to the sleeve tube 51 and extending in opposite directions. The sleeve tube 51 has an inner end portion 511 adjacent to the outer section 42 of the pedal shaft 4, an outer end portion 512 opposite to the inner end portion 511, and top and bottom faces 513, 513' between the inner and outer end portions 511, 512. The front protruding portion 52 has two front side walls 521 extending respectively and forwardly from the inner and outer end portions 511, 512 of the sleeve tube 51, and a front intermediate wall 522 interconnecting the front side walls 521. The front side walls 521, the front intermediate wall 522, and the sleeve tube 51 cooperatively define a front receiving space 54. The front intermediate wall 522 has a locking screw hole 523 that communicates with the front receiving space 54. The rear protruding portion 53 has two rear side walls 531 extending respectively and rearwardly from the inner and outer end portions 511, 512 of the sleeve tube 51, and a rear intermediate wall 532 interconnecting the rear side walls 531. The rear side walls 531, the rear intermediate wall 532, and the sleeve tube 51 cooperatively define a rear receiving space 55. The rear intermediate wall 532 has a locking screw hole 533 that communicates with the rear receiving space 55.

Figure 4:
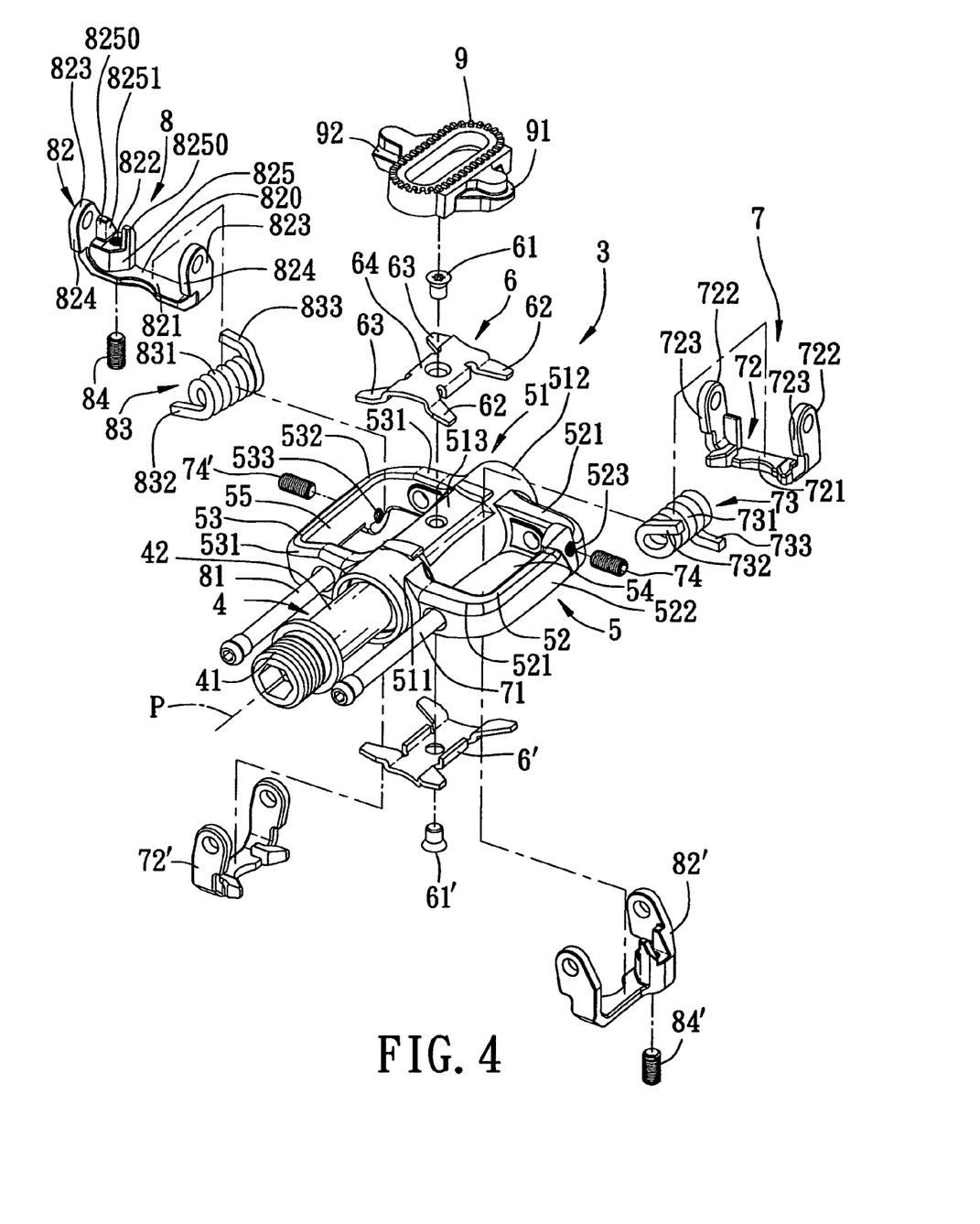
FIG. 4 is an exploded perspective view of the preferred embodiment.
Figure 6:
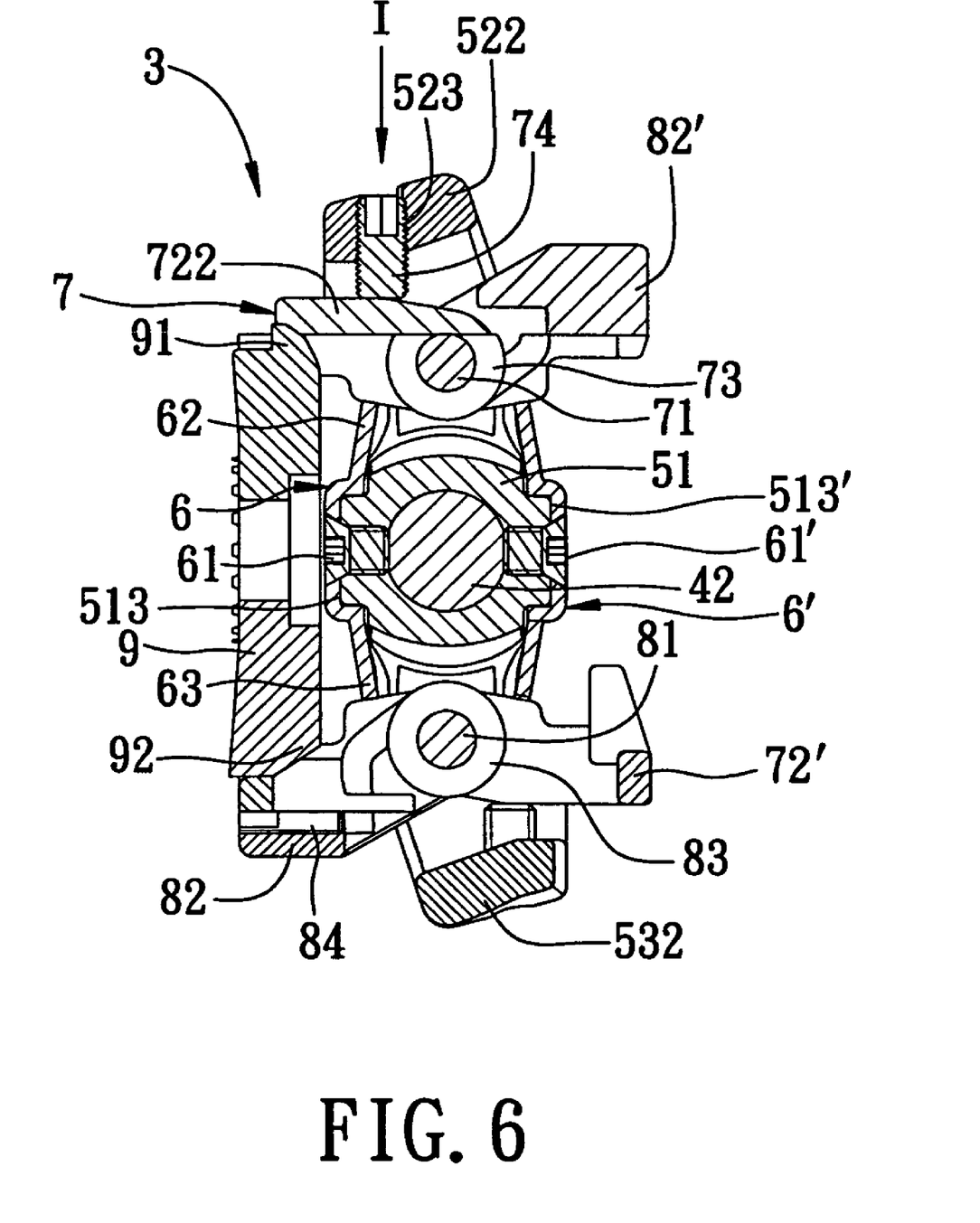
FIG. 6 is a sectional view of the preferred embodiment taken along line VI-VI of FIG. 5, illustrating how a locking member is moved to lock a front clamping member against rotational movement.

The front clamping unit 7 includes a front pivot pin 71 connected between the front side walls 521 and disposed within the front receiving space 54, a substantially U-shaped front clamping member 72 sleeved on the front pivot pin 71 and rotatable relative to the front protruding member 52, a front biasing member 73 sleeved on the front pivot pin 71 to bias the front clamping member 72 to rotate toward the sleeve tube 51, and a locking member 74 connected threadedly to the locking screw hole 523 in the front intermediate wall 522 of the front protruding portion 52. The front clamping member 72 has a front engaging portion 721 that is adapted to engage a front end 91 of the cleat 9, two spaced-apart front lugs 722 projecting respectively from two opposite ends of the front engaging portion 721 and attached rotatably to the front pivot pin 71, and two front stop faces 723 respectively provided on the front lugs 722. The locking member 74 is operable to move toward and abut against the front clamping member 72 so as to lock the front clamping member 72 against rotational movement, as best shown in FIG. 6.

Figure 8:
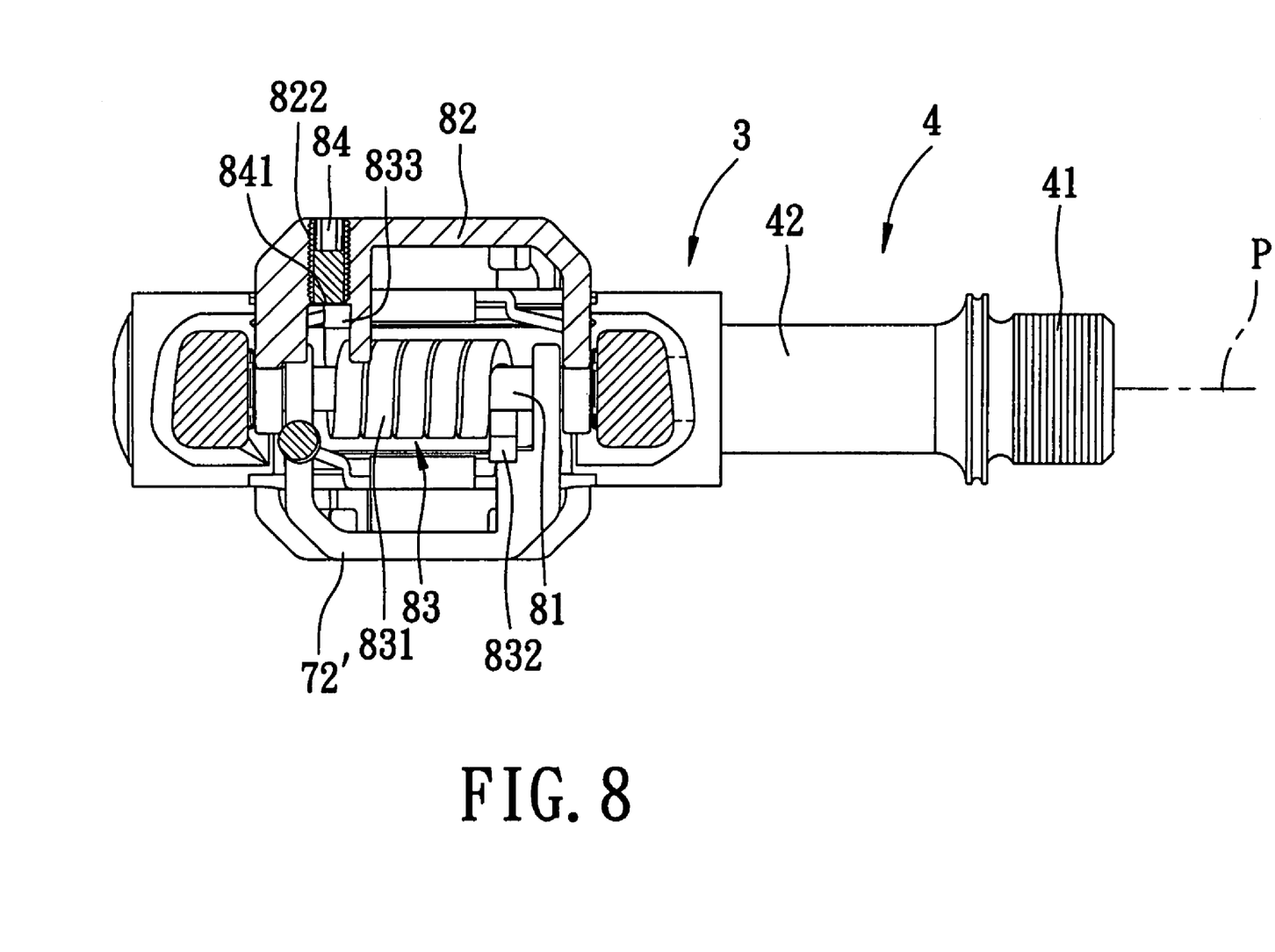
FIG. 8 is a sectional view of the preferred embodiment taken along line VIII-VIII of FIG. 5, illustrating an adjusting member in a first position.
Figure 9:
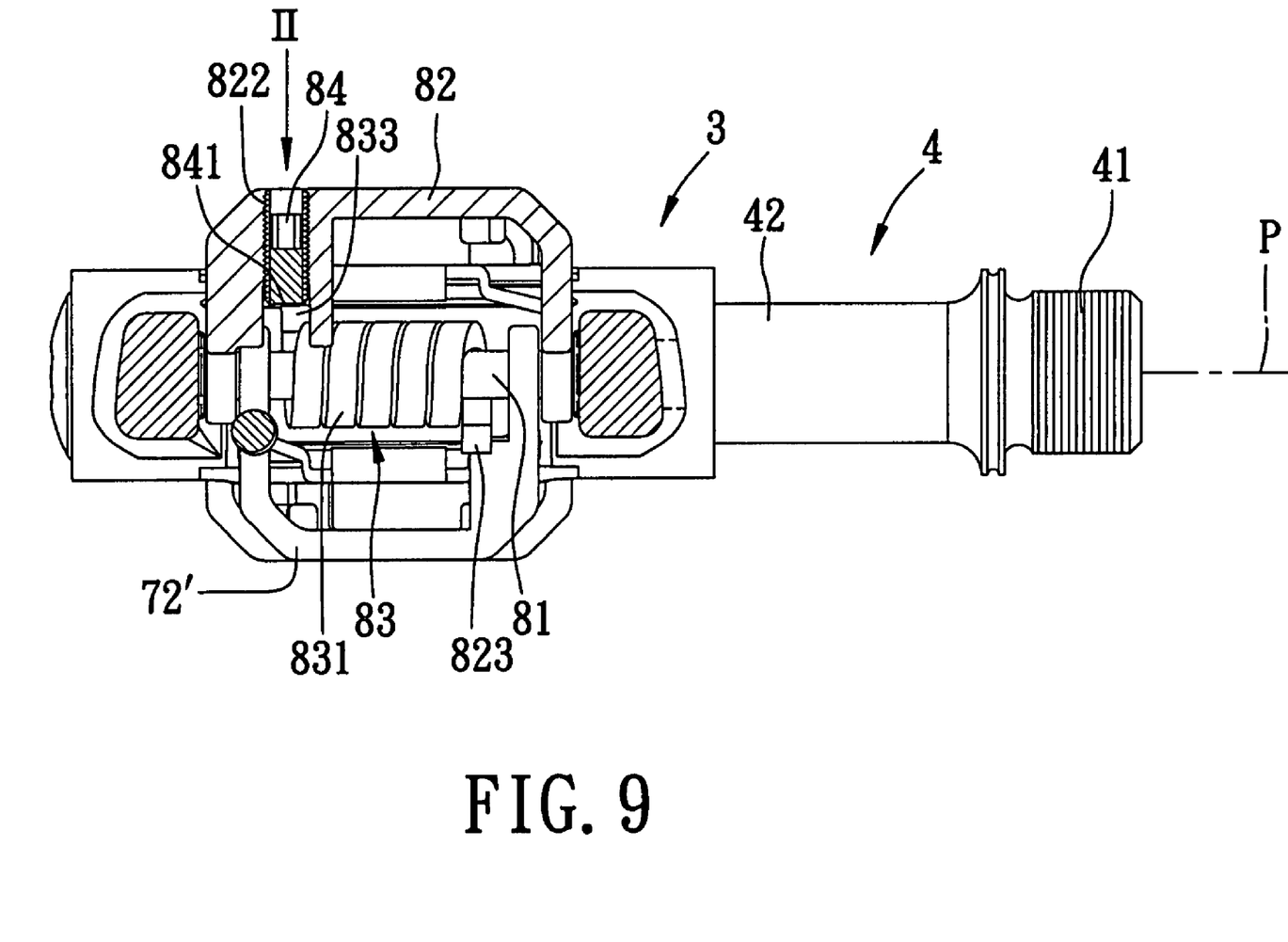
FIG. 9 is a view similar to FIG. 8, but illustrating the adjusting member in a second position.

The rear clamping unit 8 includes a rear pivot pin 81 connected between the rear side walls 531 and disposed within the rear receiving space 55, a substantially U-shaped rear clamping member 82 sleeved on the rear pivot pin 81 and rotatable relative to the rear protruding portion 53, a rear biasing member 83 sleeved on the rear pivot pin 81, and an adjusting member 84 connected to the rear clamping member 82. The rear clamping member 82 has a web portion 820, a rear engaging portion 821 that is provided on the web portion 820 and that is adapted to engage a rear end 92 of the cleat 9, two spaced-apart rear lugs 823 projecting respectively from two opposite ends of the web portion 820, and two rear stop faces 824 respectively provided on the rear lugs 823. A screw-mounting block 825 projects from the web portion 820, and includes two legs 8250 projecting from the screw-mounting block 825 to define a groove 8251, and an adjusting screw hole 822 that extends through the screw-mounting block 825 and the web portion 820 and that is aligned with the groove 8251.

The bicycle pedal assembly 3 further comprises a rear clamping member 82' sleeved rotatably on the front pivot pin 71 and disposed below the front clamping member 72, an adjusting member 84' connected threadedly to the rear clamping member 82', a front clamping member 72' sleeved rotatably on the rear pivot pin 81 and disposed below the rear clamping member 82, a locking member 74' connected threadedly to the locking screw hole 533 in the rear intermediate wall 532 of the rear protruding portion 53, and a pedal cover 6' connected fixedly to the bottom face 513' of the sleeve tube 51 through a screw 61'. If the top face 513 of the sleeve tube 51 faces upwardly, the cleat 9 can be clamped between the front and rear clamping members 72, 82, and if the bottom face 513' of the sleeve tube 51 faces upwardly, the cleat 9 can be clamped between the front and rear clamping members 72', 82'.

In this embodiment, the front biasing member 73 is a torsional spring, and the locking member 74 is configured as a locking screw. The front biasing member 73 has a coiled body 731 sleeved on the front pivot pin 71, a first end leg 732 extending outwardly from one end of the coiled body 731 and abutting against the front clamping member 72, and a second end leg 733 extending outwardly from the other end of the coiled body 731 and abutting against the rear clamping member 82'. The rear biasing member 83 is a torsional spring having a coiled body 831 sleeved on the rear pivot pin 81, a first end leg 832 extending outwardly from one end of the coiled body 831 and abutting against the front clamping member 72', and a second end leg 833 extending outwardly from the other end of the coiled body 831 and extending into the groove 8251 so as to abut against the screw-mounting block 825 of the rear clamping member 82.

Alternatively, when only the front and rear clamping members 72, 82 are mounted on the pedal body 5 (i.e., the front and rear clamping members 72', 82' are not included in the configuration), the second end leg 733 of the front biasing member 73 abuts against a part of the front protruding portion 52, and the first end leg 832 of the rear biasing member 83 abuts against a part of the rear protruding portion 53.

The adjusting member 84, in this embodiment, is configured as an adjusting screw connected threadedly to the adjusting screw hole 822 and extending into the groove 8251 so as to press the second end leg 833 of the rear biasing member 83 downwardly. Alternatively, the adjusting member 84 may include a screw connected threadedly to the adjusting screw hole 822, and a connecting member which has one end abutting against the screw, and another end abutting against the second end leg 833 of the rear biasing member 83. The adjusting member 84 is movable relative to the rear clamping member 83 between a first position, as shown in FIG. 8, where the adjusting member 84 causes the rear biasing member 83 to produce a minimum biasing force, and a second position, as shown in FIG. 9, where the adjusting member 84 causes the rear biasing member 83 to produce a maximum biasing force.

The bicycle pedal assembly 3 further comprises a one-piece pedal cover 6 having a middle part 64 disposed over the sleeve tube 51, a pair of front wings 62 projecting from the middle part 64 and abutting against the front stop faces 723 of the front clamping member 72, a pair of rear wings 63 projecting from the middle part 64 and abutting against the rear stop faces 824 of the rear clamping member 82, and a fastener 61 fastening the middle part 64 to the top face 513 of the sleeve tube 51. To protect the pedal body 5 from wear due to the cleat 9, the pedal cover 6 is made of a material harder than that of the pedal body 5.

The front biasing member 73 biases the front clamping member 72 to rotate toward the sleeve tube 51 so that the front stop faces 723 abut respectively against the front wings 62 of the pedal cover 6. The rear biasing member 83 biases the rear clamping member 82 to rotate toward the sleeve tube 51 so that the rear stop faces 824 abut respectively against the rear wings 63 of the pedal cover 6.

Figure 5:
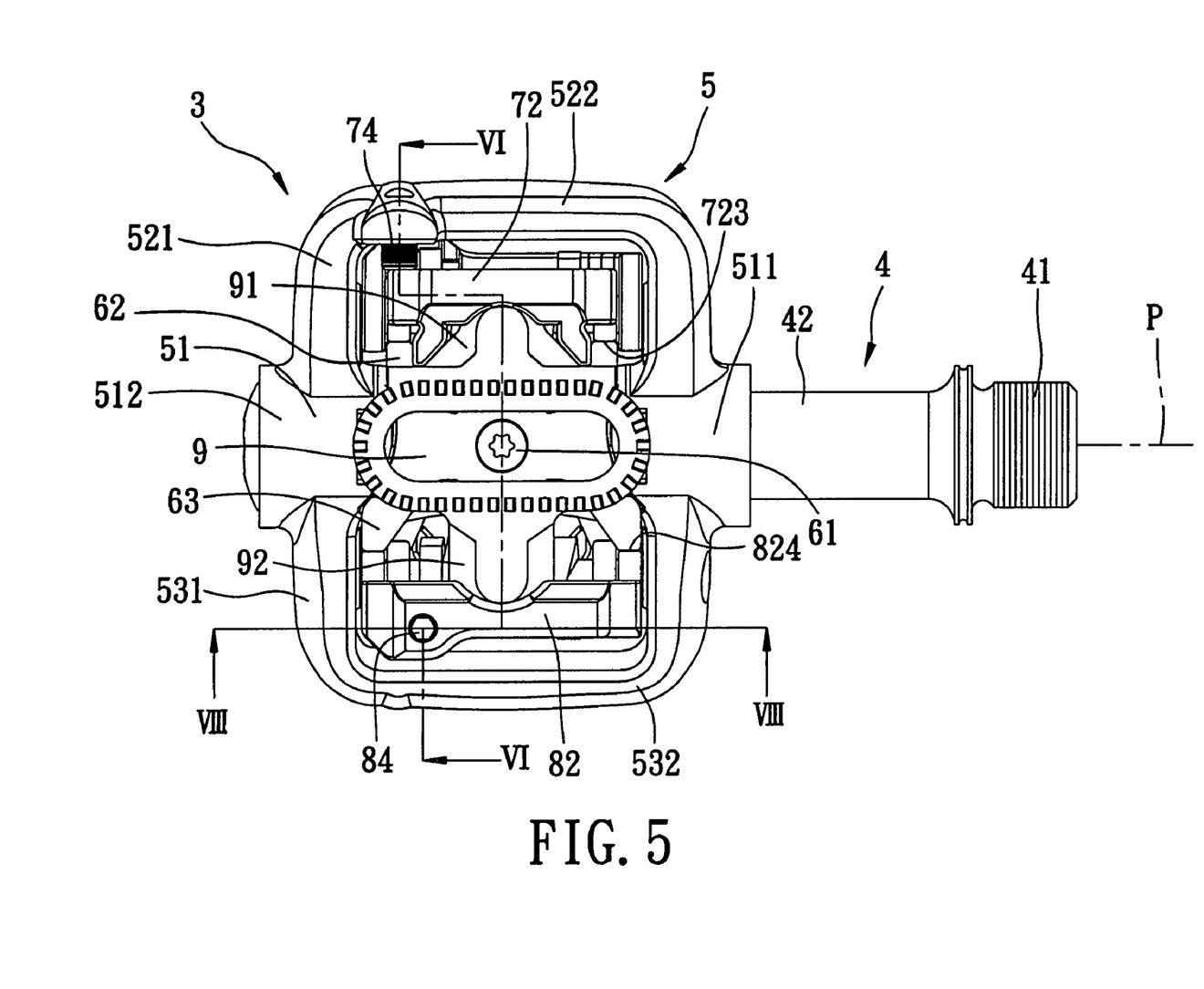
FIG. 5 is a schematic top view of the preferred embodiment.

Referring to FIGS. 5 and 6, when the bicycle pedal assembly 3 is to be mounted on a racing bike or a mountain bike, the user may operate the locking member 74 in the direction of an arrow (I) until the locking member 74 abuts against the front clamping member 72, thereby locking the front clamping member 72 against rotational movement relative to the front pivot pin 71. As the front clamping member 72 is locked by the locking member 74, the front clamping member 72 will not rotate when the user exerts a pedaling force on the same so that the front clamping member 72 can transmit the exerted pedaling force directly to the pedal shaft 4. If the front clamping member 72 is allowed to rotate, it may absorb some of the exerted pedaling force so that energy loss may result during pedaling.

Figure 7:
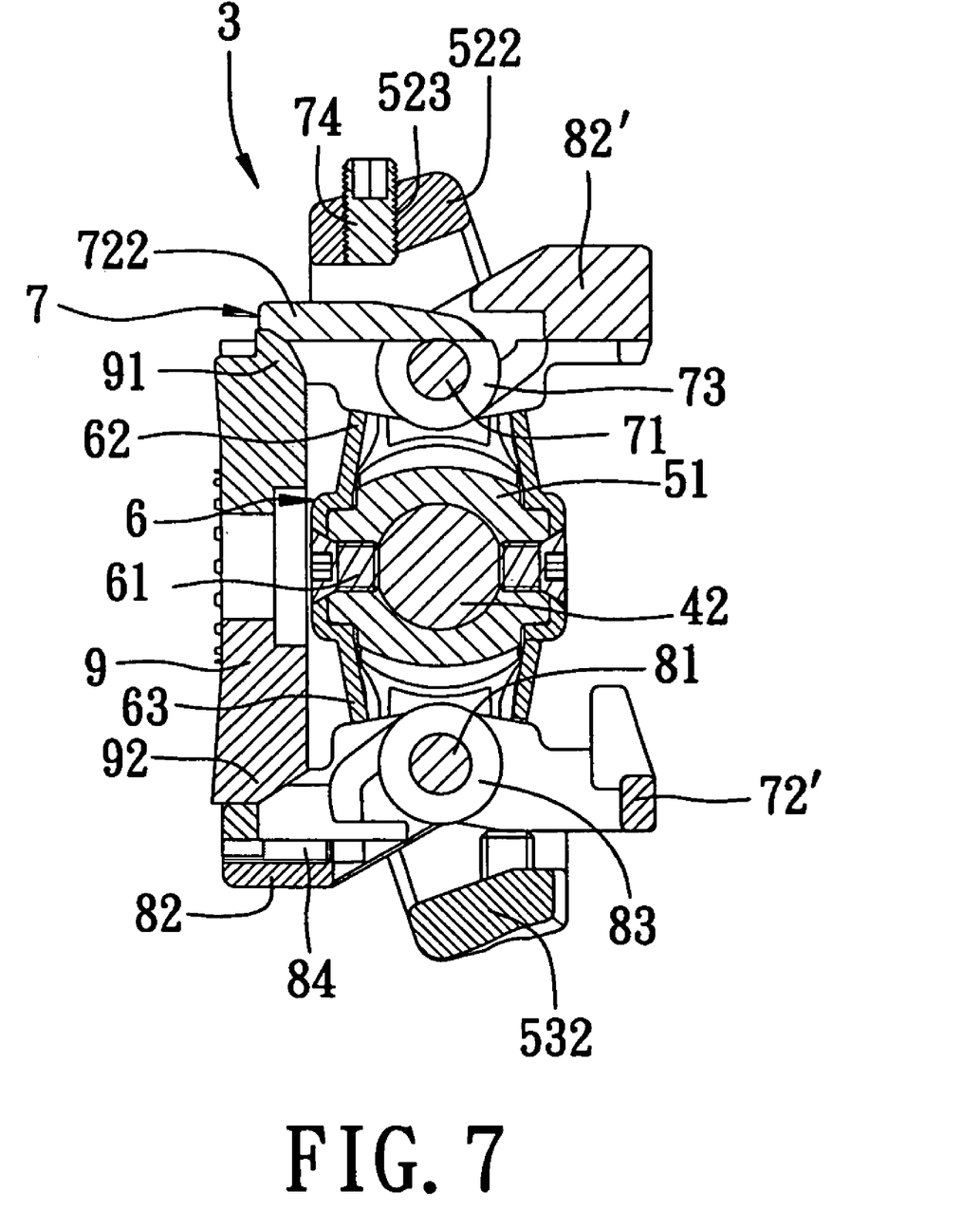
FIG. 7 is a view similar to FIG. 6, but illustrating how the locking member is moved to permit the rotational movement of the front clamping member relative to a front pivot pin.

Referring to FIG. 7, when the bicycle pedal assembly 3 is mounted on a bicycle for downhill or cross country riding, the locking member 74 is operated so as to be disposed within the locking screw hole 523, so that the front clamping member 72 can pivot relative to the front pivot pin 71. When the cleat 9 is twisted, the front and rear ends 91, 92 thereof push the front and rear clamping members 72, 82 to rotate away from the sleeve tube 51, so that the front and rear ends 91, 92 of the cleat 9 can be detached from the front and rear engaging portions 721, 821, respectively. It should be noted that even if the locking member 74 is removed from the locking screw hole 523, the front clamping member 72 can similarly pivot relative to the front pivot pin 71.

When the cleat 9 is twisted with a twisting force greater than the biasing force of the rear biasing member 83, the rear end 92 of the cleat 9 can push the rear clamping member 82 to pivot away from the sleeve tube 51 so that the cleat 9 can be removed from the front and rear clamping members 72, 82. However, if the twisting force is smaller than the biasing force of the rear biasing member 83, the cleat 9 cannot be removed from the front and rear clamping members 72, 82. Thus, in order to satisfy the different twisting forces exerted by different users on the cleat 9, the biasing force of the rear biasing member 83 can be adjusted through the adjusting member 84.

Referring to FIG. 8, when a front end 841 of the adjusting member 84 does not exert any force on the second end leg 833 of the rear biasing member 83, the biasing force of the rear biasing member 83 is at a minimum, and the adjusting member 84 is located at the first position. However, referring to FIG. 9, when the adjusting member 84 is moved along the direction of an arrow (II), the front end 841 of the adjusting member 84 presses the second end leg 833 of the rear biasing member 83 to deflect downward, thereby increasing the amount of deflection of the rear biasing member 83 that leads to an increased biasing force. The biasing force of the rear biasing member 83 is at a maximum at this time, and the adjusting member 84 is located at the second position.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle pedal assembly adapted for engagement with a cleat which is fixed to a shoe sole, said bicycle pedal assembly comprising:
   a pedal shaft;
   a pedal body including a sleeve tube sleeved rotatably on said pedal shaft, and front and rear protruding portions connected to said sleeve tube and extending in opposite directions;
   a front clamping unit including a front pivot pin, a front clamping member mounted rotatably on said front pivot pin, a front biasing member to bias said front clamping member to rotate toward said sleeve tube, and a locking member connected threadedly to said front protruding portion, said front clamping member having a front engaging portion that is adapted to engage one end of the cleat, said locking member being operable to abut against said front clamping member so as to lock said front clamping member against rotational movement;
   a rear clamping unit including a rear clamping member mounted rotatably on said rear protruding portion, and a rear biasing member to bias said rear clamping member to rotate toward said sleeve tube, said rear clamping member having a rear engaging portion that is adapted to engage another end of the cleat; and a one-piece pedal cover having a middle part disposed over said sleeve tube, a pair of front wings projecting from said middle part and abutting against said front clamping member, a pair of rear wings projecting from said middle part and abutting against said rear clamping member, and a fastener fastening said middle part to said sleeve tube, said pedal cover being made of a material harder than that of said pedal body.

2. A bicycle pedal assembly adapted for engagement with a cleat which is fixed to a shoe sole, said bicycle pedal assembly comprising:

a pedal shaft;

a pedal body including a sleeve tube sleeved rotatably on said pedal shaft, and front and rear protruding portions connected to said sleeve tube and extending in opposite directions;

a front clamping unit including a front pivot pin, a front clamping member mounted rotatably on said front pivot pin, a front biasing member to bias said front clamping member to rotate toward said sleeve tube, and a locking member connected threadedly to said front protruding portion, said front clamping member having a front engaging portion that is adapted to engage one end of the cleat, said locking member being operable to abut against said front clamping member so as to lock said front clamping member against rotational movement; and a rear clamping unit including a rear clamping member mounted rotatably on said rear protruding portion, and a rear biasing member to bias said rear clamping member to rotate toward said sleeve tube, said rear clamping member having a rear engaging portion that is adapted to engage another end of the cleat;

wherein said locking member is configured as a locking screw connected threadedly to said pedal body; and wherein said front protruding portion has two front side walls, and a front intermediate wall interconnecting said front side walls and having a locking screw hole, said front clamping member further having two spaced-apart front lugs projecting respectively from two opposite ends of said front engaging portion and attached rotatably to said front pivot pin, said locking screw being engaged threadedly to said locking screw hole and movable to abut against one of said front lugs.

3. A bicycle pedal assembly adapted for engagement with a cleat which is fixed to a shoe sole, said bicycle pedal assembly comprising:

a pedal shaft;

a pedal body including a sleeve tube sleeved rotatably on said pedal shaft, and front and rear protruding portions connected to said sleeve tube and extending in opposite directions;

a front clamping unit including a front clamping member mounted rotatably on said front protruding portion, and a front biasing member to bias said front clamping member to rotate toward said sleeve tube, said front clamping member having a front engaging portion that is adapted to engage one end of the cleat;

a rear clamping unit including a rear clamping member mounted rotatably on said rear protruding portion, a rear biasing member to bias said rear clamping member to rotate toward said sleeve tube, and an adjusting member connected threadedly to said rear clamping member for abutting against said rear clamping member, said rear clamping member having a rear engaging portion that is adapted to engage another end of the cleat, said adjusting member being movable relative to said rear clamping member between a first position, where said adjusting member causes said rear biasing member to produce a minimum biasing force, and a second position, where said adjusting member causes said rear biasing member to produce a maximum biasing force; and a one-piece pedal cover having a middle part disposed over said sleeve tube, a pair of front wings projecting from said middle part and abutting against said front clamping member, a pair of rear wings projecting from said middle part and abutting against said rear clamping member, and a fastener fastening said middle part to said sleeve tube, said pedal cover being made of a material harder than that of said pedal body.

4. A bicycle pedal assembly adapted for engagement with a cleat which is fixed to a shoe sole, said bicycle pedal assembly comprising:

a pedal shaft;

a pedal body including a sleeve tube sleeved rotatably on said pedal shaft, and front and rear protruding portions connected to said sleeve tube and extending in opposite directions;

a front clamping unit including a front clamping member mounted rotatably on said front protruding portion, and a front biasing member to bias said front clamping member to rotate toward said sleeve tube, said front clamping member having a front engaging portion that is adapted to engage one end of the cleat;

a rear clamping unit including a rear clamping member mounted rotatably on said rear protruding portion, a rear biasing member to bias said rear clamping member to rotate toward said sleeve tube, and an adjusting member connected threadedly to said rear clamping member for abutting against said rear clamping member, said rear clamping member having a rear engaging portion that is adapted to engage another end of the cleat, said adjusting member being movable relative to said rear clamping member between a first position, where said adjusting member causes said rear biasing member to produce a minimum biasing force, and a second position, where said adjusting member causes said rear biasing member to produce a maximum biasing force;

wherein said adjusting member is configured as an adjusting screw connected threadedly to said rear clamping member; and wherein said rear clamping member further has a web portion, and two spaced-apart rear lugs projecting from two opposite ends of said web portion, said rear engaging portion being provided in said web portion, said web portion having a screw-mounting block projecting from said web portion and including a groove, and an adjusting screw hole extending through said web portion and said screw-mounting block and aligned with said groove, said rear biasing member having a torsional spring with one end extending into said groove to push said screw-mounting block, said adjusting screw being engaged threadedly to said adjusting screw hole and being extendable into said groove so as to press said one end of said rear biasing member.

* * * * *